Dec. 21, 1937.                L. A. PHILIPP                2,102,740
                         REFRIGERATING APPARATUS
                           Filed Nov. 26, 1934            2 Sheets-Sheet 1
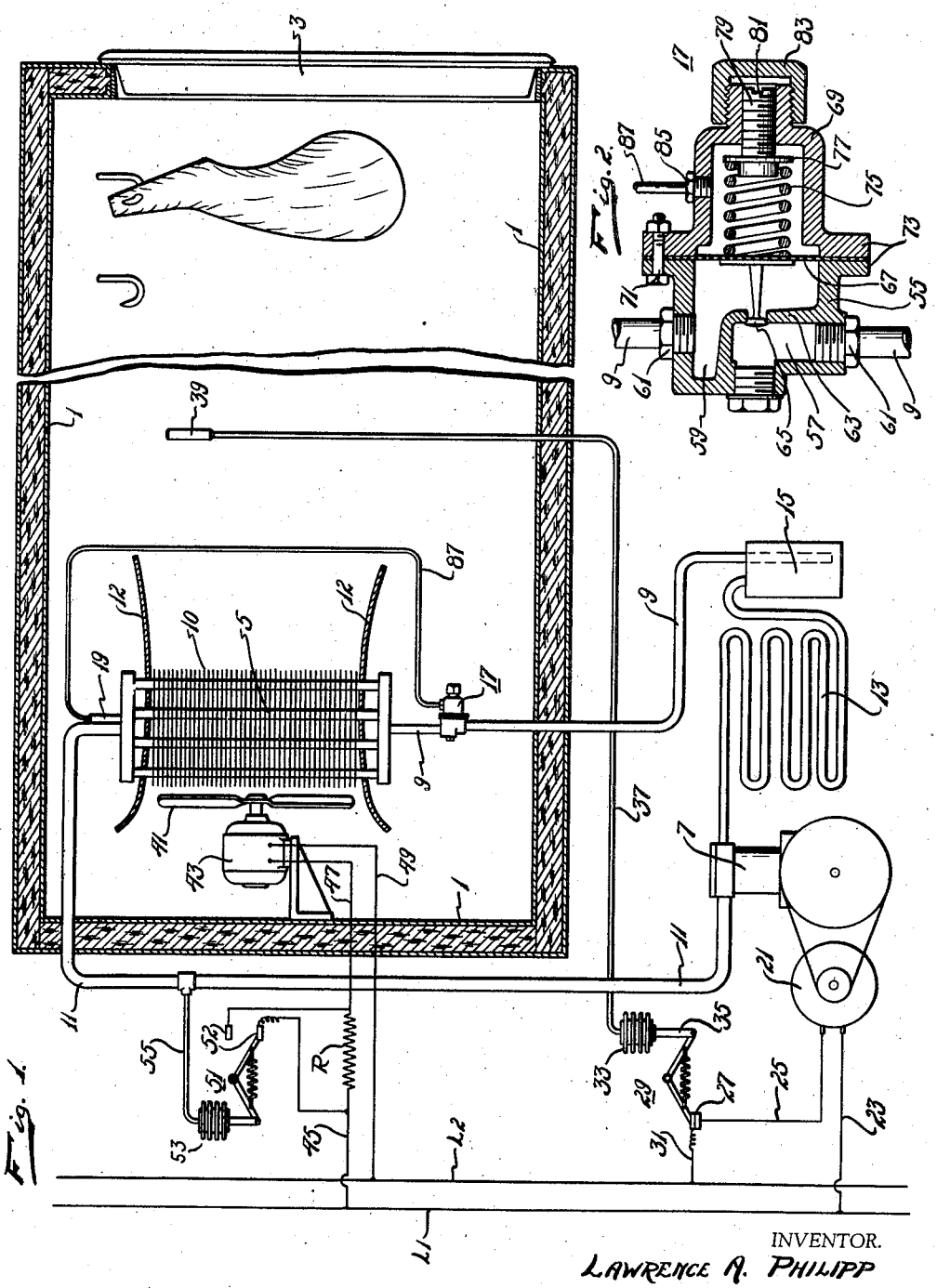
INVENTOR.
LAWRENCE A. PHILIPP
BY
ATTORNEY.

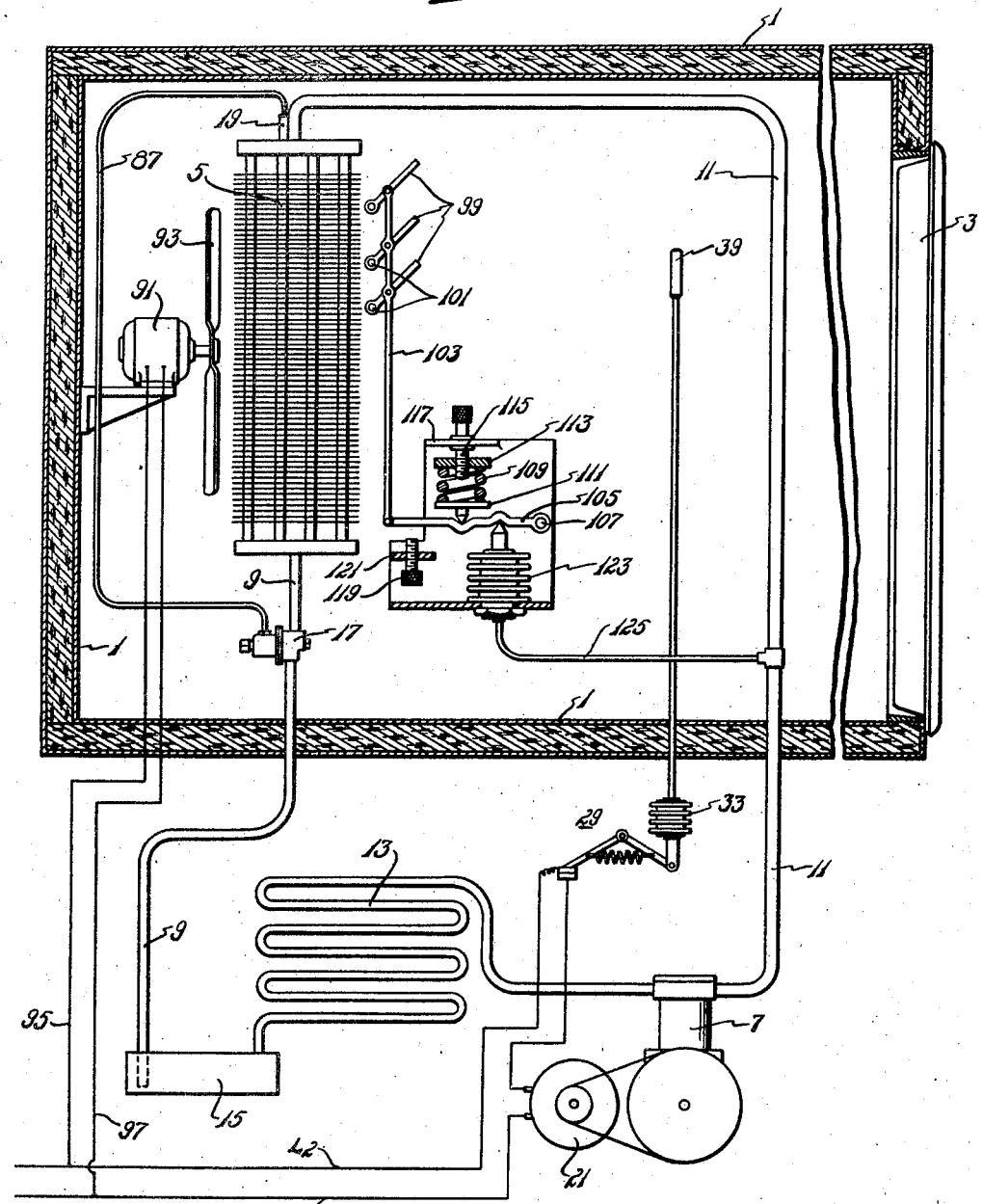

Patented Dec. 21, 1937

2,102,740

UNITED STATES PATENT OFFICE 2,102,740

REFRIGERATING APPARATUS

Lawrence A. Philipp, Detroit, Mich., assignor, by mesne assignments, to Nash-Kelvinator Corporation, Detroit, Mich., a corporation of Maryland Application November 26, 1934, Serial No. 754,704

6 Claims. (Cl. 62—129)

My invention pertains to air conditioning systems and more particularly to an improved method of and apparatus for automatically controlling the temperature and humidity of air or other gases.

It is an object of my invention to control the humidity of air cooled by a heat absorbing element by a method which consists in suitably controlling the circulation of the air over the heat absorbing element.

It is also an object of my invention to provide an air cooling and dehumidifying system comprising a refrigerant evaporator associated with a condensing element which is automatically operated intermittently for maintaining a predetermined temperature range, and associated air flow controlling means responsive to the pressure in the suction line for increasing the circulation of air around the evaporator in response to decreasing suction line pressure.

It is a further object of my invention to provide such a system comprising air circulating means for driving the air around the evaporator and speed controlling means therefore responsive to the pressure in the suction line for increasing the volume of air circulating over the evaporator in response to a decreasing pressure in the suction line, thereby transferring more heat to the evaporator at a higher temperature and removing substantially only the sensible heat from the air without removing relatively large quantities of the latent heat therefrom.

Another object of my invention is to provide such a system with an air flow obstructing device and controlling means for moving said device to unobstructing position in response to decreasing pressure in the suction line.

The invention, itself, however, both as to its organization and its method of operation, together with additional objects and advantages thereof, will best be understood from the following description of specific embodiments, when read in conjunction with the accompanying drawings, in which:

Fig. 1 is a diagrammatic view schematically representing an air cooling and dehumidifying system arranged in accordance with one form of my invention;

Fig. 2 is a detail view showing the construction of a thermostatic expansion valve used in the system; and Fig. 3 is a diagrammatic view showing an air conditioning system arranged in accordance with another embodiment of my invention.

Although my system may be applied for controlling the temperature and humidity of the air in any room or compartment, I have preferably disclosed it as installed for conditioning the air in a food storage compartment such as a butcher's meat storage box.

The optimum conditions for the preservation of stored meat involve temperature and humidity both of which must be maintained within a predetermined range. In accordance with my invention the humidity is controlled by properly regulating the flow of the air in the compartment over a heat absorbing element. It is to be understood that the term "air" as used throughout has reference to the gas enclosed in the compartment whether it be ordinary air, a special preservative gas such as carbon dioxide, or a mixture of gases.

As shown in Fig. 1, the meat storage box is enclosed by heat insulating walls 1 and a closure member 3. The air conditioning apparatus comprises a heat absorber 5 of any suitable type which is automatically controlled to maintain the temperature in the box within the desired temperature range. If a compression type refrigerating system is utilized, as shown, the heat absorber 5 comprises an evaporator for a volatile refrigerant which is supplied from any suitable source such as a compressor 7 operatively connected thereto through conduit means comprising a refrigerant line 9 and a suction line 11. The evaporator may comprise finned cooling coils 10 and be provided with curved baffle plates 12 for controlling the flow of air. In operation the refrigerant vapor is drawn from the evaporator through the suction line 11 and is compressed to a high pressure in the compressor machine 7 passing thence through the coils of a condenser 13 where its latent heat of vaporization is dissipated to the adjacent atmosphere or other heat absorbing medium. The liquefied refrigerant then flows into a receiver 15 from which it passes through the refrigerant line 9 to the evaporator 5.

To control the admission of refrigerant to the evaporator 5 an automatic expansion valve 17 is interconnected between the refrigerant line 9 and the evaporator. A thermo-bulb 19 disposed adjacent the outlet of the evaporator for automatically controlling the valve, in a manner to be subsequently set forth.

The refrigerant compressor 7 is driven by an electric motor 21 which has an energizing circuit extending from a line conductor L1 through a conductor 23 directly to the motor thence from the other motor terminal by way of a conductor 25 through the contacts 27 of a snap action switch 29 and by way of a conductor 31 to the other line conductor L2.

The motor controlling switch 29 is actuated by a flexible metal bellows 33 to which it is connected by a suitable link 35. The flexible metal bellows 33 is connected through a conduit 37 to a thermo-bulb 39 from which it receives actuating pressures which vary in accordance with the temperatures in the box and it accordingly actuates the switch 29 to start or stop the compressor. It will be understood that, if preferred, the motor 21 may operate continuously and the temperature responsive control switch 29 may be connected to vary the operating speed thereof as by shunting a series resistor, or in any other well known manner. Also the pressure responsive bellows 33 which actuates the switch 29 may be connected for direct operation from the refrigerant system, if desired. The operating characteristics of the motor control switch may be readily set to maintain the desired temperature range as by properly selecting or adjusting the tension of the biasing spring or by providing a suitable volatile fluid in the thermo-bulb which provides the actuating pressures.

In accordance with one form of my invention the air in the compartment to be conditioned is circulated over the heat absorber 5 by a fan 41 driven by a variable speed electric motor 43. For controlling the speed of the fan motor 43 a resistor R is connected into its energizing circuit, which extends from main line conductor L1 by way of a conductor 45 through the resistor R thence by way of a conductor 47 to one terminal of the motor. From the other terminal of the motor its energizing circuit extends by way of conductor 49 to the other main line conductor L2. To shunt the resistor R out of the motor circuit for increasing the motor speed, a snap acting switch 51 is provided having its contacts 52 connected to opposite ends of the resistor and actuated by a flexible metal bellows 53, similarly to the thermostatic compressor control switch previously described. A conduit 55 is interconnected between the flexible metal bellows 53 and the suction line 11 whereby the switch 51 is actuated for opening or closing its contacts 52 in shunt relation around the resistor R to thereby cut the resistor into or out of the motor energizing circuit.

In this manner the speed of the fan 41 is controlled in accordance with the temperature of the evaporator 5 by the pressure variations in the suction line. The slow speed of the motor 43 is determined by the resistance of the resistor R, and the operating characteristics of the pressure responsive switch 51 are predetermined by suitably selecting or adjusting the biasing springs, or in any suitable manner. The speed of the motor 43 is suitably predetermined for regulating the speed of the fan 41 for cooling the box and conditioning the air therein in a manner to be subsequently set forth.

As shown in Fig. 2, the automatic expansion valve 17 which controls the admission of refrigerant into the evaporator 5 comprises a valve casing 55 providing an inlet port 57 and an outlet port 59 having suitable pipe fittings 61 for connecting the refrigerant line 9 thereto. A partition member 63 which separates the inlet port from the outlet port has a valve seat in which a fluid flow restricting valve 65 is supported, from a flexible diaphragm 67, for operatively approaching or engaging the seat to accordingly restrict the flow of refrigerant therethrough. The valve supporting diaphragm 67 is clamped in hermetically sealed engagement on the open side of the casing 55 adjacent the outlet port 59 by a valve cover 69 secured to the casing by suitable bolts 71 which extend through flanges 73 extending laterally around the edges of the valve casing and the cover. A biasing compression spring 75 is provided in the cover 69 for biasing the valve 65 toward its open position.

A stop 77 receives the outer end of the spring and is adjustably supported on the end of a screw threaded shaft 79 which screws through the end wall of the cover. The externally exposed end of the adjustable stop shaft 79 is provided with a slot 81 to receive a screw driver to facilitate adjusting the tension on the spring 75, and a protective cap 83 is normally disposed over the end of the valve casing cover 69 on which it is threadedly secured.

The valve cover 69 is provided with a pipe fitting 85 for receiving a conduit 87 to apply the pressures set up in the thermo-bulb 19 which is disposed adjacent the outlet of the evaporator 5. The pressures set up by the vaporization of a volatile liquid in the thermo-bulb 19 are thus applied to one side of the diaphragm 67 of the automatic expansion valve 17 which is thereby correspondingly flexed to move the valve 65 toward or away from its seat. The valve 17 is preferably so adjusted, by turning the threaded shaft 79, that when liquid refrigerant passes from the outlet of the evaporator 5, or evaporates in the immediate vicinity thereof, the resulting low temperature and pressure in the thermo-bulb causes the valve 65 to be seated to thereby cut-off the flow of liquefied refrigerant into the evaporator 5. This prevents the wasteful over-supply of liquid refrigerant to the evaporator 5 and prevents the return of liquid therefrom to the compressor.

In operation the desired temperature range is maintained by the thermo-bulb 39 in the box which actuates the control switch 29 to start or stop the compressor unit 7, in accordance with the instant temperature. When the temperature in the box rises above a predetermined value, the control switch starts the compressor unit which establishes a low suction pressure in the evaporator 5 and in the suction line 11 as it draws refrigerant vapor therefrom. Under the low pressure conditions thus established, vaporization of the refrigerant in the evaporator takes place at a more rapid rate thereby absorbing heat more rapidly from the air, which is circulated through the finned cooling coils 10 of the evaporator 5 by the fan 41, thus cooling the box.

With low heat loads on the evaporator 5, the fan motor 43 operates at a low speed because the speed control switch 51 is opened by the high suction pressures in the suction line. Consequently a relatively small volume of air passes over the heat absorber 5 in a unit time, and the heat in the box is thus carried thereto at a slow rate. Under this operating condition the system is arranged to maintain the evaporator 5 at a temperature which is substantially equal to or lower than the dew point of the air for all humidity values which exceed the allowable humidity values which exceed the allowable humidity for the optimum preservation conditions. Since an excessive amount of moisture is present in the normal use of the box, the operation of the heat absorber at temperatures below the dew point for excessively humid air, automatically maintains the optimum conditions by sweating or frosting out the excess water vapor carried by the air.

If the heat load is increased, as by storing a quantity of relatively warm food in the box, the compressor 7 is automatically operated over longer time periods thereby reducing the suction pressure in the suction line 11. This in turn actuates the pressure responsive fan motor control switch 51 which shunts out the resistor R and increases the speed of the fan motor 43 thereby carrying heat to the finned evaporator coils 10 at a more rapid rate. This cools the box, and at the same time tends to raise the temperature of the heat absorber 5, and consequently the pressure in the suction line 11. Because of the tendency of the large volume of warm air to raise the temperature of the evaporator 5 it operates at a temperature which is substantially above the dew point of air having the desired degree of humidity.

By thus passing, in unit time, a much larger volume of air over the heat absorber 5 at a higher temperature, a larger total amount of heat is removed from the air, in unit time, which consists substantially only of sensible heat while removing substantially no latent heat from the air, as distinguished from the other condition when the evaporator is operated at a lower temperature thereby removing sensible heat from the air with a large portion of latent heat. In this manner the box is cooled without excessively dehumidifying the air and dehydrating the food stored therein. In this manner a heavy demand may be satisfied without the usual dehumidifying effects.

In accordance with another embodiment of my invention, a motor 91 which drives a fan 93 and circulates the air over the heat absorber 5 is connected directly to the main line conductors L1 and L2 through suitable conductors 95 and 97 and operates at constant speed, and the flow of air is variably controlled by a suitable flow obstructing device, as shown in Fig. 3, in which similar reference characters are applied to indicate the elements which correspond to similar elements of the system previously described.

In this embodiment the air which is circulated over the heat absorber 5 by the constant speed motor 91 and fan 93, and is variously controlled by movable air obstructing vanes 99 disposed in the path of the circulating air. The air obstructing vanes 99 are pivotally supported on suitable pivot pins 101 adjacent the finned coils 10 of the evaporator and they are actuated by a connecting bar 103 pivotally secured thereto in any suitable manner. For automatically actuating the vanes 99, the end of the connecting bar 103 is pivotally joined to the free end of a lever 105, the other end of which is journalled on a fixed pivot 107. A biasing compression spring 109 is disposed to react between a plate 111 pivoted on the lever 105 and a stop member 113 which is adjustably supported on a screw threaded shaft 115 which screws through a stationary bracket 117 member. By turning a knurled knob 119 on the end of the threaded shaft 117 the latter may be rotated to adjust the position of stop 113 and vary tension of the biasing spring 109 on the lever 105. The biasing spring 109 urges the lever 105 and the associated connecting rod 103 downwardly to open the air vanes 99 which movement is limited by an opposing stop screw 119 which is adjustably supported adjacent the free end of the lever by a stationary bracket 121.

For actuating the connecting rod 103, to open, or close the air flow controlling vanes 99, a flexible corrugated metal bellows 123 is mounted adjacent the pivotally mounted end of the lever 105 in operative engagement therewith on the side opposing the biasing spring. By means of an interconnecting conduit 125 extended to the suction line 11 variable pressures are applied in the bellows 123 in accordance with the heat load and the operating conditions of the system.

In operation the thermostatic motor control switch 29 operates the refrigerant compressor unit 7 intermittently to maintain the temperature of the meat storage box within predetermined limits in the usual manner. When the heat load is greater, the compressor 7 is operated for longer time periods and creates a lower suction pressure in the suction line 11 than when the heat load is light. When the operating conditions are such that a low suction pressure is created in the suction line 11, the flexible bellows 123 contracts and opens the air vanes 99 which permits a much larger volume of air to be driven through the evaporator coils 10 by the constant speed fan 93. This carries the heat to the evaporator at a more rapid rate which cools the box and tends to raise the temperature of the evaporator above the dew point, for air of the proper humidity, thereby increasing the humidity and the suction pressure in the suction line 11. The movements of the air obstructing vanes 99 are so regulated, by properly adjusting the biasing spring 109, that the proper humidity of the air is maintained during normal operating conditions. The forced convection circulation of the air increases the capacity of the cooling element, which may be small, and also more uniform cooling is provided throughout the compartment.

It will be apparent that in accordance with either embodiment of my invention the pressure responsive means for regulating the air circulation may be connected to various portions of the system, or to a thermo-bulb, to obtain varying degrees and modes of operation as desired. My conditioning system may also be utilized for controlling the temperature and humidity of carbon dioxide or any other preservative gases which may be provided in the food storage compartment.

It will be seen that I have provided a simplified air cooling and dehumidifying system for removing varying proportions of moisture from the air while maintaining the temperature between predetermined fixed limits comprising means for circulating the air over a single heat absorbing element in such a manner that the humidity is regulated whilst increasing the capacity of the cooling element, and providing substantially uniform cooling throughout the compartment.

Aside from the specific embodiments of the invention herein shown and described, it will be understood that numerous details of the construction may be altered or omitted without departing from the spirit and scope of the invention as disclosed and claimed, and that I do not desire to limit the invention to the exact construction herein set forth.

I claim as my invention:
1. The combination of a compartment to be cooled, a single refrigerant evaporator, means for automatically dissipating the heat absorbed by said evaporator to maintain a predetermined temperature range in said compartment, means for driving gas over said evaporator, and means responsive to the outlet pressure of said evaporator for so controlling the flow of gas that the evaporator operates at proper temperatures for remov- ing both the sensible and the latent heat from excessively humid gas and substantially only the sensible heat from gas of proper humidity.

2. In a conditioning system, the combination of a refrigerant evaporator, a refrigerant compressor-condenser-unit, a suction line connecting the low side of said unit with said evaporator for drawing refrigerant vapor therefrom, a refrigerant line connecting the high side of said unit with said evaporator for supplying liquefied refrigerant thereto, automatic control means for operating said unit in accordance with the demand, and means for circulating gas over said evaporator at a rate which is increased in response to decreasing pressure in said suction line.

3. In a conditioning system, the combination of a refrigerant evaporator, a refrigerant compressor-condenser-unit, a suction line connecting the low side of said unit with said evaporator for drawing refrigerant vapor therefrom, a refrigerant line connecting the high side of said unit with said evaporator for supplying liquefied refrigerant thereto, automatic control means for operating said unit in accordance with the demand, gas circulating means for circulating gas over said evaporator, and pressure responsive control means for causing the operating speed of said circulating means to increase or decrease as the pressure in said suction line respectively decreases or increases.

4. In a conditioning system, the combination of a refrigerant evaporator, a refrigerant compressor-condenser-unit, a suction line connecting the low side of said unit with said evaporator for drawing refrigerant vapor therefrom, a refrigerant line connecting the high side of said unit with said evaporator for supplying liquefied refrigerant thereto, automatic control means for operating said unit in accordance with the demand, circulating means for circulating gas over said evaporator, gas flow obstructing means, and pressure responsive control means for moving said gas flow obstructing means to regulate the air flow in accordance with the pressure in said suction line.

5. In a conditioning system the combination of a refrigerant evaporator, a refrigerant circulating device, means for causing air to flow over said refrigerant evaporator, and means directly responsive to the temperature of the evaporator for controlling the flow of air over the evaporator so that the evaporator operates at proper temperatures for removing both sensible and latent heat from excessively humid air and substantially only the sensible heat from air of proper humidity.

6. In a conditioning system the combination of a refrigerant evaporator, a refrigerant circulating device, means for causing air to flow over said refrigerant evaporator, and thermostatic means directly associated with the evaporator for controlling the flow of air over the evaporator so that the evaporator operates at proper temperatures for removing both sensible and latent heat from excessively humid air and substantially only the sensible heat from air of proper humidity.

LAWRENCE A. PHILIPP.